US012581325B2

(12) United States Patent
Ji et al.

(10) Patent No.: US 12,581,325 B2
(45) Date of Patent: Mar. 17, 2026

(54) APPARATUS FOR WIRELESS COMMUNICATIONS SYSTEM AND USER EQUIPMENT

(71) Applicant: Nokia Technologies OY, Espoo (FI)

(72) Inventors: Lianghai Ji, Aalborg (DK); Daniela Laselva, Klarup (DK); Chunli Wu, Beijing (CN); Benoist Sebire, Tokyo (JP)

(73) Assignee: NokiaTechnologies Oy, Espoo (FI)

( * ) Notice: Subject to any disclaimer, the term of this patent is extended or adjusted under 35 U.S.C. 154(b) by 596 days.

(21) Appl. No.: 17/996,147

(22) PCT Filed: Apr. 23, 2020

(86) PCT No.: PCT/CN2020/086500
§ 371 (c)(1),
(2) Date: Oct. 13, 2022

(87) PCT Pub. No.: WO2021/212437
PCT Pub. Date: Oct. 28, 2021

(65) Prior Publication Data
US 2023/0138554 A1 May 4, 2023

(51) Int. Cl.
*H04W 24/04* (2009.01)
*H04W 76/19* (2018.01)

(52) U.S. Cl.
CPC ........... *H04W 24/04* (2013.01); *H04W 76/19* (2018.02)

(58) Field of Classification Search
CPC ..... H04W 24/04; H04W 24/08; H04W 24/10; H04W 76/14; H04W 76/15; H04W 76/18; H04W 76/19; H04W 76/30; H04W 76/34; H04W 36/0055; H04W 36/0027; H04W 36/0061; H04W 36/0077; H04W 36/0079;
(Continued)

(56) References Cited

U.S. PATENT DOCUMENTS

| | | | | |
|---|---|---|---|---|
| 11,877,183 B2 * | 1/2024 | Baek | ...................... | H04W 28/06 |
| 11,917,706 B2 * | 2/2024 | Hong | .................... | H04W 76/30 |

(Continued)

FOREIGN PATENT DOCUMENTS

| | | |
|---|---|---|
| CN | 101873655 A | 10/2010 |
| CN | 107567041 A | 1/2018 |

(Continued)

OTHER PUBLICATIONS

3rd Generation Partnership Project; Technical Specification Group Radio Access Network; NR; Radio Resource Control (RRC) protocol specification (Release 15) 3GPP TS 38.331 V15.8.0 (Dec. 2019) pp. 1-532.
(Continued)

*Primary Examiner* — Jason E Mattis
*Assistant Examiner* — Scott A Schlack
(74) *Attorney, Agent, or Firm* — Lippes Mathias LLP

(57) ABSTRACT
An Apparatus for a wireless communications system, comprising at least one processor, and memory storing instructions that, when executed by the at least one processor, cause the apparatus at least to configure a user equipment with a radio link control, RLC, failure configuration which defines how the user equipment should react to an RLC failure of a first logical channel associated with the user equipment.

9 Claims, 4 Drawing Sheets

(58) Field of Classification Search
CPC ............. H04W 36/0085; H04W 36/26; H04W 36/305; H04W 72/0413; H04W 72/1247; H04W 72/1284; H04W 72/14; H04W 12/04; H04W 12/08
See application file for complete search history.

(56) References Cited

U.S. PATENT DOCUMENTS

| | | | | |
|---|---|---|---|---|
| 2018/0279401 | A1* | 9/2018 | Hong | H04W 36/0064 |
| 2019/0215717 | A1* | 7/2019 | Lee | H04W 72/21 |
| 2019/0246323 | A1* | 8/2019 | Kim | H04W 36/0058 |
| 2020/0053826 | A1 | 2/2020 | Shi | |
| 2020/0120569 | A1* | 4/2020 | Baek | H04W 28/06 |
| 2021/0045142 | A1* | 2/2021 | Joseph | H04L 5/0044 |
| 2022/0174771 | A1* | 6/2022 | Baek | H04W 76/15 |
| 2023/0013393 | A1* | 1/2023 | Kim | H04W 76/19 |

FOREIGN PATENT DOCUMENTS

| | | | |
|---|---|---|---|
| CN | 108632902 | A | 10/2018 |
| CN | 110475275 | A | 11/2019 |
| WO | 2017/164908 | A1 | 9/2017 |
| WO | 2019/062801 | A1 | 4/2019 |
| WO | 2019/153139 | A1 | 8/2019 |
| WO | WO-2019193519 | A1 | 10/2019 |

OTHER PUBLICATIONS

3rd Generation Partnership Project; Technical Specification Group Radio Access Network; NR; NR and NG-RAN Overall Description; Stage 2 (Release 15) 3GPP TS 38.300 V15.8.0 (Dec. 2019) pp. 1-99.

3rd Generation Partnership Project; Technical Specification Group Radio Access Network; NR; User Equipment (UE) radio transmission and reception; Part 1: Range 1 Standalone (Release 16) 3GPP TS 38.101-1 V16.2.0 (Dec. 2019) pp. 1-310.

International Search Report for International Application No. PCT/CN2020/086500 dated Jan. 14, 2021.

Office action received for corresponding Chinese Patent Application No. 202080100106.2, dated Nov. 13, 2024, 9 pages of office action and 10 pages of translation available.

Extended European Search Report received for corresponding European Patent Application No. 20932833.5, dated Dec. 19, 2023, 7 pages.

"Report of 3GPP TSG RAN2#109-e meeting, Online", 3GPP TSG-RAN WG2 meeting #109bis-e, R2-2002501, Agenda Item: 2.2, ETSI MCC, Feb. 24-Mar. 6, 2020, pp. 1-370.

Office action received for corresponding Chinese Patent Application No. 202080100106.2, dated May 27, 2024, 10 pages of office action and 10 pages of translation available.

"3rd Generation Partnership Project; Technical Specification Group Radio Access Network; NR; Radio Link Control (RLC) protocol specification (Release 15)", 3GPP TS 38.322, V15.5.0, Mar. 2019, pp. 1-33.

"3rd Generation Partnership Project; Technical Specification Group Radio Access Network; Evolved Universal Terrestrial Radio Access (E-UTRA) and NR; Multi connectivity; Stage 2 (Release 16)", 3GPP TS 37.340, V16.0.0, Dec. 2019, pp. 1-72.

Office Action received for corresponding Japnese Patent Application No. 2022-564139, dated Oct. 24, 2023, 4 pages of Office Action and 5 pages of summary and translation available.

"Updates to reestablishment procedure", 3GPP TSG-RAN WG2 Meeting #109bis-e, R2-2002970, ZTE Corporation, Apr. 20-30, 2020, pp. 1-7.

"Correction on RLC retransmissions at RLC failure in CA duplication", 3GPP TSG-WG2 Meeting #103, R2-1811883, Ericsson, Aug. 20-24, 2018, 3 pages.

* cited by examiner

Fig. 4
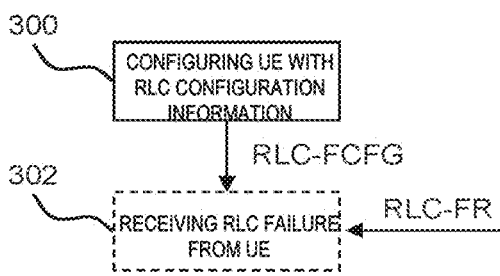
Fig. 5
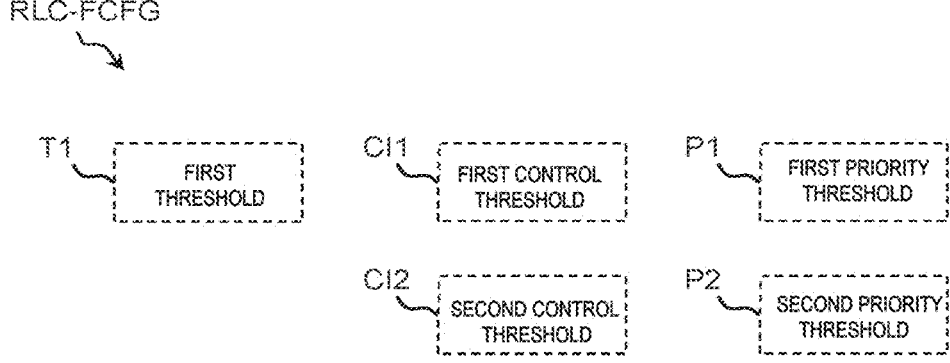
Fig. 6                                    Fig. 7
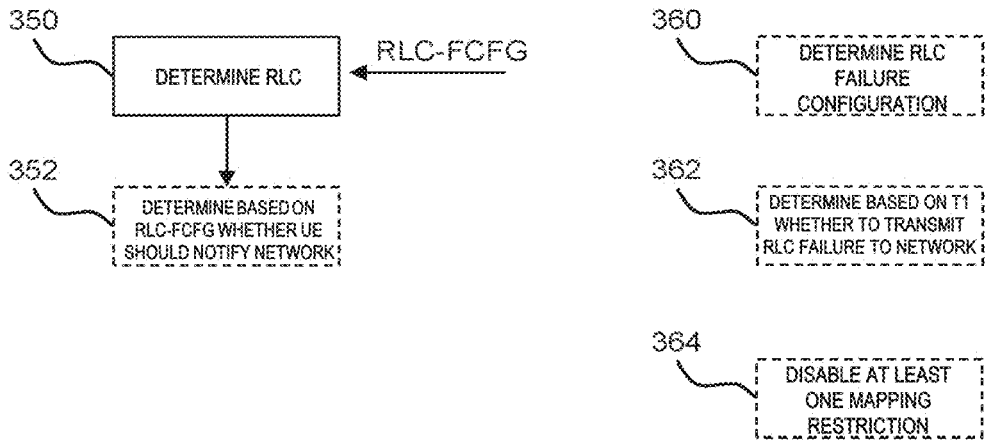

Fig. 8

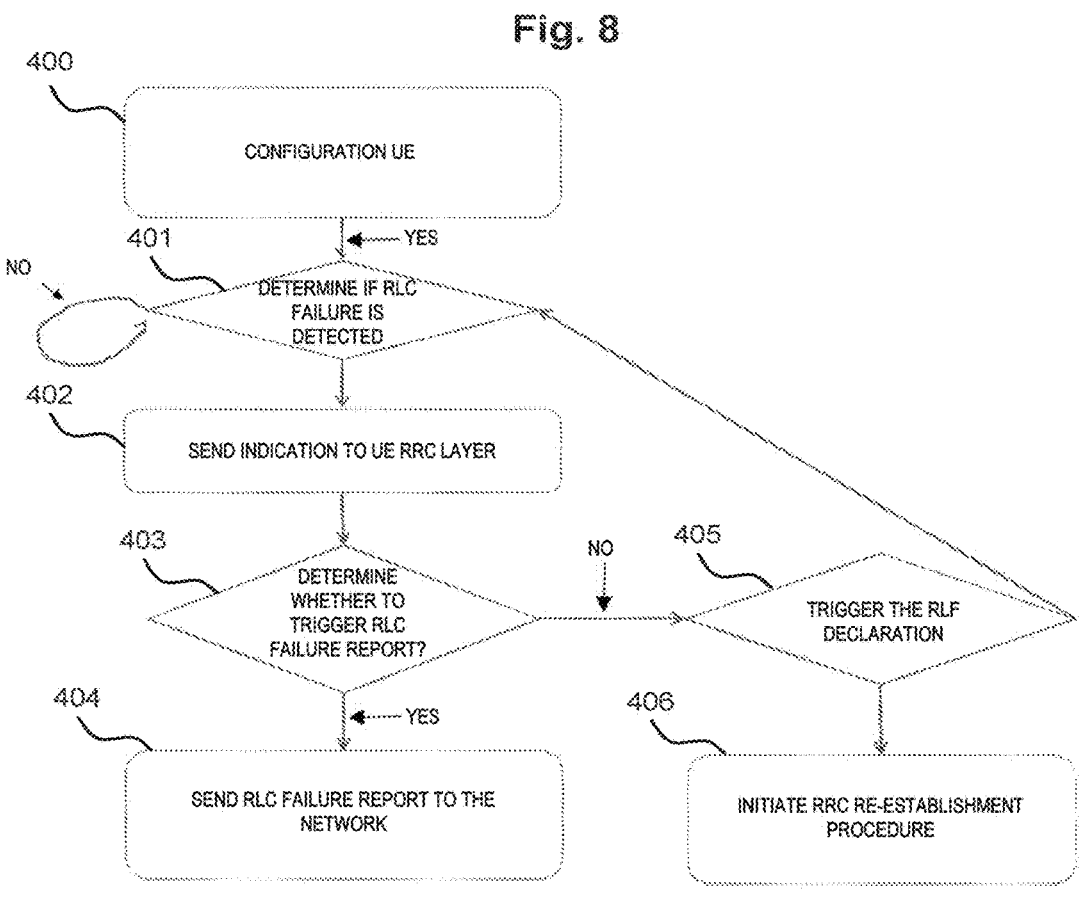

400
CONFIGURATION UE

401 ← YES

NO
401
DETERMINE IF RLC
FAILURE IS
DETECTED

402
SEND INDICATION TO UE RRC LAYER

403
DETERMINE
WHETHER TO
TRIGGER RLC
FAILURE REPORT?

NO

405
TRIGGER THE RLF
DECLARATION

404 ← YES

SEND RLC FAILURE REPORT TO THE
NETWORK

406
INITIATE RRC RE-ESTABLISHMENT
PROCEDURE

Fig. 9

UE                                          gNB

RLC-CONFIG.
410

LCP RESTRICTION OF RLG
FAILURE INFORMATION
411

412
RADIO LINK MONITORING

DETECT CONFIGURED TRIGGER
FOR RLC FAILURE REPORT

413

TRANSMISSION OF RLC
FAILURE INFORMATION

414

415
NETWORK ACTION PERFORMED BASED
ON RLC FAILURE REPORT

417
UE RECONFIGURING OF LCH
AFFECTED BY RLC FAILURE

416
RECONFIGURATION
MESSAGE

APPARATUS FOR WIRELESS COMMUNICATIONS SYSTEM AND USER EQUIPMENT

CROSS-REFERENCE TO RELATED APPLICATIONS

This application is a national phase under 35 U.S.C. § 371 of PCT International Application No. PCT/CN2020/086500 which has an International filing date of Apr. 23, 2020, the entire contents of each of which are hereby incorporated by reference.

FIELD OF THE DISCLOSURE

The disclosure relates to an apparatus for a wireless communications system.

The disclosure further relates to a user equipment (UE).

The disclosure further relates to a method of operating an apparatus for a wireless communications system.

The disclosure further relates to a method of operating a user equipment.

BACKGROUND

Wireless communications systems may e.g. be used for wireless exchange of information between two or more entities.

SUMMARY

The scope of protection sought for various embodiments of the disclosure is set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus for a wireless communications system, comprising at least one processor, and memory storing instructions that, when executed by the at least one processor, cause the apparatus at least to configure a user equipment with a radio link control, RLC, failure configuration which defines how the user equipment should react to an RLC failure of a first logical channel associated with the user equipment.

In some embodiments, the apparatus or its functionality, respectively, may be provided in a network element of the communications systems, for example in a base station, e.g. a gNodeB (gNB).

In some embodiments, the apparatus according to the embodiments or its functionality, respectively, may be used for or within wireless communications systems based on or at least partially adhering to third generation partnership project, 3GPP, radio standards such as 4G E-UTRAN or 5G NR (fifth generation new radio). In some embodiments, the apparatus according to the embodiments or its functionality, respectively, may be used for a radio link failure (RLF), procedure of 5G NR-based communications systems.

As an example, one triggering condition for an RLF in a Uu interface as currently defined e.g. for 5G NR is characterized as follows: upon indication from a radio link control (RLC) layer that a maximum number of RLC retransmissions has been reached when using an RLC acknowledged mode (AM). According to this triggering condition, a maximal number of retransmissions in RLC is configured by using a parameter "maxRetxThreshold", which is configured in the information element (IE) "RLC-Config", as per 3GPP TS 38.331 (cf. e.g. 3GPP TS 38.331 V15.8.0 (2019-12)), and used by a transmitting side of an AM RLC entity to limit a total number of retransmissions of an RLC packet data unit (PDU). The detection of the RLF in this case may cause the UE to either transit to RRC_IDLE state or initiate a radio resource control (RRC) connection re-establishment procedure.

The maximal number of retransmissions parameter (i.e. maxRetxThreshold configured in RLC-Config) as currently defined e.g. for 5G NR applies to RLC AM as defined in 3GPP TS 38.331, where value t1 corresponds to 1 retransmission, value t2 corresponds to 2 retransmissions and so on. If the maximal number of retransmissions of an RLC entity is reached in an exemplary single cell scenario, a RLF will be declared, which will trigger the UE to re-establish the RRC connection with NW—as described above. More specifically, all radio bearers (RBs) except SRB0 will be suspended at the time when the RLF is declared. These suspended RBs (i.e., SRB2 and DRBs) can be resumed first upon receiving the first RRCReconfiguration message after the RRC connection re-establishment procedure is successfully completed. Thus, the user-plane data cannot be transmitted during the time when the DRBs are being resumed, thus causing an undesired interruption in the running applications.

As per TS 38.331, RLC-Config is comprised within the IE RLC-BearerConfig, which is used to configure an RLC entity and the corresponding logical channel (LCH) in MAC for uplink (besides the linking to a PDCP entity). Thus, distinct RLC entities can be configured for the UE (e.g. for different logical channels) and these can be configured differently, e.g. with different values for the maximal number of retransmissions.

In the current definition of RLF, as currently defined e.g. for 5G NR, a RLC failure for one logical channel/RLC entity (e.g., when reaching the maxRetxThreshold) implies the declaration of an RLF, and in turn, the suspending of all DRBs, which will interrupt the data transmission on any other DRB.

As an example, first, when an RLC failure happens, it could be due to a radio condition and/or protocol problems. In case of radio problems, it means that even RLC retransmissions cannot help recovering from radio losses. Although it can be expected that typically a radio link monitoring (RLM) procedure can detect a radio issue before an RLC failure happens, the RLM procedure as currently defined e.g. for 5G NR is limited to a primary cell (PCell). Thus, RLC failures may occur likely due radio problems on secondary cells (SCells) or due to a protocol failure (including a configuration issue), rather than a radio issue only on the PCell.

Besides, 5G NR also introduced a restriction of "allowed cells" an LCH can use which is different to legacy LTE in that an RLC failure for a LCH might only be a problem for those allowed cells for that LCH (e.g. if they are unlicensed cells, high frequency cells etc.) but should not impact other LCHs if they are using different cells with higher reliability/better channel quality.

This means that, according to some embodiments, an RLC failure of one RLC entity may not imply that another other logical channel cannot be supported adequately. This is an aspect which may be especially relevant when different service types with divergent quality of service (Qos) requirements coexist in a device. For example, achieving the maxRetxThreshold value from a logical channel used for a ultra-reliable and low-latency communication (URLLC) service should not necessarily trigger a suspension of logical channels with more relaxed QoS requirements, e.g. logical channels used to support massive machine type communication (mMTC) and/or enhanced mobile broadband (eMBB) services.

As a further example, secondly, the re-establishment that is triggered because of an RLC failure may be a comparatively slow procedure since it may include a cell selection (of the old or a new cell), a random-access procedure to the selected cell, with several RRC messages to be exchanged. In case of an RLC failure that is caused by protocol/configuration issues, a recovery attempt by the same cell (e.g. by reconfiguring the affected RLC entity) may be likely successful. But that would be initiated only after an unnecessary delay due to the re-establishment.

Some embodiments address aspects such as e.g. a method for handling RLC failures which aims at a faster recovery of an affected RLC entity (i.e. the RLC entity that detected the RLC failure(s)), while at the same time they may allow non-affected RLC entities to continue their service.

According to some embodiments, as already mentioned above, a user equipment may use the RLC failure configuration provided e.g. by configuration via the apparatus according to some embodiments to determine how to react to such RLC failure.

According to some embodiments, the RLC failure configuration defines whether the user equipment should notify the RLC failure of the first logical channel to a network.

According to some embodiments, the RLC failure configuration defines whether the user equipment should notify the RLC failure of the first logical channel to a network when at least a second logical channel associated with the user equipment operates normally, i.e. does not experience an RLC failure. According to some embodiments, this may enable to keep a normal, i.e. uninterrupted, operation for at least the second LCH and/or RB associated therewith, e.g. rather than declaring a RLF and initiating a re-establishment.

As an example, a second logical channel associated with the user equipment operates normally, e.g. when the second logical channel has not reached a predetermined number (e.g. a first threshold or the maximum RLC retransmission number) of RLC retransmissions.

According to some embodiments, the UE may be configured with multiple LCHs and/or RLC entities.

According to some embodiments, the UE may be configured with an individual RLC failure configuration per LCH, which enables to provide different LCHs with different RLC failure configurations.

According to some embodiments, the instructions, when executed by the at least one processor, further cause the apparatus to explicitly configure the user equipment with the RLC failure configuration.

According to some embodiments, the user equipment may also be configured implicitly with the RLC failure configuration.

According to some embodiments, which may e.g. be based on a multi-cell carrier aggregation (CA)/dual connectivity (DC) scenario, per-LCH configuring whether an RLC failure for an LCH should trigger an RLC failure report rather than re-establishment may be done implicitly, e.g. based on an allowed cell configuration for the LCH.

According to some embodiments, the implicit configuration may be part of the allowed cell configuration and may be enabled/disabled per UE. For instance, the configured cells that are allowed for a failed LCH, i.e. the first LCH, can be considered failed and may thus be suspended/deactivated, as long as there is at least another cell not failed and mapped to at least another LCH: under these conditions, according to some embodiments, an RLC failure report may be triggered without (RRC) re-establishment. According to some embodiments, otherwise, e.g. if any other cell is also failed or no other non-failed LCH is mapped to a cell, an RRC re-establishment is initiated.

In some embodiments, the allowed cells are unlicensed cells and/or high frequency cells (e.g., using the frequency range FR2 as e.g. defined by 3GPP 38.101-1, cf. e.g. 3GPP TS 38.101-1 V16.2.0 (2019-12), Table 5.1-1), since these may be more prone to radio errors. This ensures that problems on these cells will not impact other LCHs if they are using different cells with higher reliability/better channel quality.

In some embodiments, the RLC failure configuration comprises a first threshold, wherein the user equipment may determine, based on the first threshold, whether to transmit the RLC failure to a or the network.

In some embodiments, the first threshold is a predetermined number of RLC retransmissions.

According to some embodiments, which may e.g. be based on a single-cell scenario or a multi-cell CA/DC scenario, the first threshold may be seen as a new (additional) threshold in view of the existing threshold parameter "maxRetxThreshold", which is configured in the information element (IE) "RLC-Config", as per 3GPP TS 38.331 (cf. e.g. 3GPP TS 38.331 V15.8.0 (2019-12)).

According to some embodiments, the first (i.e., new) threshold may e.g. be denoted as "maxRetxThreshold_RLCReport" and may be configured to the UE to determine a) when (and/or whether) to report the RLC failure of the first LCH, for example if the current number of RLC AM retransmissions reaches the first threshold, and/or b) when (whether) to declare an RLF (e.g., if the current number of RLC AM retransmissions reaches the existing threshold parameter "maxRetxThreshold" defined for RLF detection).

According to some embodiments, the value of the first threshold "maxRetxThreshold_RLCReport" can be set lower than the existing "maxRetxThreshold", e.g. to first trigger a report. According to some embodiments, this enables an attempt to first recover/solve an RLC failure issue, e.g. by reconfiguring of protocol parameters for the affected (first) LCH or changing the allowed cells and/or other LCP restrictions, before declaring an RLF and suspending all DRBS.

According to some embodiments, the RLC failure configuration comprises a first control information indicating to the user equipment whether to disable at least one mapping restriction.

According to some embodiments, which may e.g. be based on a single-cell scenario or a multi-cell CA/DC scenario, upon detecting that a given number of RLC AM retransmissions is reached for an RLC entity/LCH (corresponding e.g. to the maximum number defined for RLF detection (e.g., existing "maxRetxThreshold") or to a lower configured number, e.g. the first threshold according to some embodiments explained above), if the LCH is configured with LCP (logical channel prioritization) mapping restrictions (e.g. according to allowedCG_list, allowedPriorityLevels, and allowedServingCells, cf. e.g. 3GPP TS 38.300 V15.8.0 (2019-12), e.g. chapter 16.1.2), the UE may disable at least one of those mapping restrictions (e.g., instead of triggering a RLF), which may be beneficial to get data to be transmitted through as soon as possible, and which may exemplarily be referred to as some actions of the "recovery behavior" according to some embodiments.

According to some embodiments the disabling of least one of those mapping restrictions may be performed automatically, i.e. without an explicit instruction to be received by the UE.

According to some embodiments, enabling this "recovery behavior" may depend on a network configuration. The configuration (e.g., in addition to the possible first threshold according to some embodiments explained above) may indicate which LCP mapping restrictions to disable (e.g., via an information element (IE) "RestrictionsDisableList"). For instance, according to some embodiments, after disabling a restriction according to "allowedServingCells", the UE may fill an UL grant applicable to a cell previously restricted for the affected (e.g., first) LCH with data from that LCH. According to some embodiments, in turn, the presence of data of that LCH in the transmission corresponding to that grant may be implicitly indicative for the network that the UE has disabled the (LCP mapping) restriction, and in turn that the UE has experienced an RLC failure or the UE has reached the first threshold according to some embodiments explained above.

According to some embodiments, the first control information indicates which of a plurality of mapping restrictions to disable.

According to some embodiments, the RLC failure configuration comprises at least one priority threshold, wherein the user equipment may determine, based on the at least one priority threshold whether to transmit the RLC failure to a or the network.

According to some embodiments, the user equipment may determine, based on the at least one priority threshold and based on at least one of a) a lowest priority of logical channels associated with the user equipment, b) a priority of the first logical channel, whether to transmit the RLC failure to a or the network.

According to some embodiments, a first priority threshold and a second priority threshold may be provided.

According to some embodiments, which may e.g. be based on a single-cell scenario or a multi-cell CA/DC scenario, the UE may send an RLC failure report to the NW if the lowest priority of any existing logical channel is lower than the first configured threshold P1, and the priority of the LCH detecting RLC failure is higher than the second threshold P2. According to some embodiments, if another LCH with certain (i.e., non-vanishing) QoS difference and/or configuration difference comparing to the LCH detecting the RLC failure is configured, the RLC failure from the affected LCH (i.e. the one detecting the RLC failure) need not imply the failure of the other LCH and, thus, the other LCH should not be affected. Alternatively, according to some embodiments, it is configured per LCH or a priority threshold if a failure happens to an LCH with higher or lower priority than a configured threshold, RLC failure report is triggered.

According to some embodiments, the instructions, when executed by the at least one processor, further cause the apparatus to configure the user equipment, for example an LCH/RLC entity, with a second control information, for example a flag, indicating at least one of: a) the user equipment should declare a radio link failure upon detection of the RLC failure of the first logical channel, b) the user equipment should transmit the RLC failure of the first logical channel to the network, e.g. in the form of an RLC failure report, c) the user equipment should declare a radio link failure upon detection of an RLC failure of at least one other logical channel than the first logical channel, d) the user equipment should transmit the RLC failure report upon detection of an RLC failure of at least one other logical channel than the first logical channel.

According to some embodiments, the second control information, for example the flag, can be set considering the QoS requirements of the LCH/RLC entity and/or the set of configured LCH/RLC entities.

According to some embodiments, the instructions, when executed by the at least one processor, further cause the apparatus to set at least a part of the RLC failure configuration based on at least one user equipment specific condition.

According to some embodiments, the value of the first threshold and/or the conditions to declare a radio link failure and/or to send an RLF failure report can be set considering UE-specific conditions, e.g. the existing services in the UE and optionally also their Qos requirements. For instance, if both an eMBB service and a URLLC service coexist according to some embodiments, an RLC failure only from the URLLC service will not declare an RLF.

According to some embodiments, a or the first threshold and a second threshold may be configured, and the UE may send an RLC failure report to the NW if the highest value of the maximal number of retransmissions parameter (i.e. "maxRetxThreshold" configured in RLC-Config) as currently defined e.g. by 5G NR for an existing logical channel is higher than the first configured threshold, and the value of the "maxRetxThreshold" of the LCH detecting RLC failure is lower than the second configured threshold. In this option, the UE can ensure a large difference in terms of maxRetx-Threshold between the declaring LCH (LCH that declares a RLF) and other LCHs. Thus, the RLC failure of the affect RLC entity should not affect the operation of another LCH.

According to some embodiments, the instructions, when executed by the at least one processor, further cause the apparatus to broadcast at least a part of the RLC failure configuration, for example at least one of: the first threshold, the second threshold.

According to some embodiments, the apparatus or the network may broadcast at least a part of the RLC failure configuration, for example at least one of the first threshold, the second threshold, in a system information block (SIB).

Further embodiments relate to a user equipment comprising at least one processor, and memory storing instructions that, when executed by the at least one processor, cause the user equipment at least to determine a radio link control, RLC, failure configuration which defines how the user equipment should react to an RLC failure of a first logical channel associated with the user equipment.

According to some embodiments, determining the RLC failure configuration may comprise at least one of: receiving (e.g., for embodiments with explicit configuration) the RLC failure configuration from an apparatus, e.g. an apparatus according to the embodiments, and/or a gNB, determining the RLC failure configuration from other data and/or configuration (e.g., for embodiments with implicit configuration).

According to some embodiments, at least some of the RLC failure configuration at the user equipment may also be specified in a standard, e.g. in a 3GPP technical specification, and/or may be provisioned by UE-implementation.

According to some embodiments, the instructions, when executed by the at least one processor, further cause the user equipment to determine, based on the RLC failure configuration, whether the user equipment should notify the RLC failure of the first logical channel to a network, e.g. when at least a second logical channel associated with the user equipment operates normally.

According to some embodiments, the instructions, when executed by the at least one processor, further cause the user equipment to determine the radio link control, RLC, failure configuration based on a configuration of allowed cells for at least one logical channel.

According to some embodiments, the RLC failure configuration comprises a first threshold, wherein the instructions, when executed by the at least one processor, further cause the user equipment to determine, based on the first threshold, whether to transmit the RLC failure to a or the network.

In some embodiments, the first threshold is a predetermined number of RLC retransmissions.

According to some embodiments, the RLC failure configuration comprises a first control information indicating to the user equipment whether to disable at least one mapping restriction, wherein the instructions, when executed by the at least one processor, further cause the user equipment to disable the at least one mapping restriction based on the first control information.

According to some embodiments, the RLC failure configuration comprises at least one priority threshold, wherein the instructions, when executed by the at least one processor, further cause the user equipment to determine, based on the at least one priority threshold, and optionally, on at least one of: a) a lowest priority of logical channels associated with the user equipment, b) a priority of the first logical channel, whether to transmit the RLC failure to a or the network.

According to some embodiments, the instructions, when executed by the at least one processor, further cause the user equipment to: determine whether a predetermined number of RLC retransmissions is reached for a logical channel served by a first cell, and, if the predetermined number of RLC retransmissions is reached for the logical channel, to transmit the RLC failure to the network for the logical channel if at least one further logical channel served by the first cell has not reached a predetermined number of RLC retransmissions.

According to some embodiments, the predetermined number of RLC retransmission may be the configured first threshold or a maximum RLC retransmission number.

According to some embodiments, the instructions, when executed by the at least one processor, further cause the user equipment to: determine if it can re-select another cell, which has a radio channel quality better than a first quality threshold, and, if it can re-select another cell, which has a radio channel quality better than the first quality threshold, to re-establish a radio resource control, RRC, connection with the other cell based on the RLC failure configuration, and, if it cannot re-select another cell, which has a radio channel quality better than the first quality threshold, to determine whether to send an RLC failure report to a current serving cell based on the RLC failure configuration.

According to some embodiments, the UE's upper layers may be configured, e.g. by the apparatus and/or the network, to act differently upon receiving a report of RLC failure from an RLC entity: According to some embodiments, the upper layers may analyze the affected services due to the RLC failure (i.e., the service(s) with data to be transmitted in the logical channel detecting the RLC failure).

According to some embodiments, the upper layers of the UE may check if certain service/application(s) cannot be supported any more, e.g. due to the RLC failure of the first LCH. According to some embodiments, if a service has strict QoS requirements, it probably needs to be stopped due to the unavailability of the LCH detecting the RLC failure. In this case, according to some embodiments, if this service uses multiple LCHs and some of these LCHs are only used by this service, the RLC failure message may also contain an information/recommendation to suspend the LCHs/RBs, which are only used by the affected service. This may ensure the LCHs only serving the affected service will be suspended.

According to some embodiments, after its suspension, the LCH will not be used in the following transmission until it is resumed and/or reconfigured.

According to some embodiments, if the affected service can adjust itself to tolerate the deteriorated performance, the UE may indicate this in the RLC failure report, e.g. by including a corresponding indication in the RLC failure report. According to some embodiments, this indication may provide the NW with the flexibility to decide whether to reconfigure the affected LCH/DRB or to suspend it. According to some embodiments, again, an indication of the LCH(s) only serving the affected service can be included in the RLC failure report so that the NW can make a decision with better knowledge.

Some embodiments relate to a method of operating an apparatus for a wireless communications system, comprising: configuring a user equipment with a radio link control, RLC, failure configuration which defines how the user equipment should react to an RLC failure of a first logical channel associated with the user equipment.

Some embodiments relate to a method of operating a user equipment, comprising: determining a radio link control, RLC, failure configuration which defines how the user equipment should react to an RLC failure of a first logical channel associated with the user equipment.

Though some of the elaborations and embodiments use the radio interface between a UE and a network, e.g. gNB, according to some embodiments, the basic principle may also be applied for other communications and/or radio interfaces as well, e.g. to handle an RLC failure of a sidelink (SL) RLC entity that may be used for a sidelink communication between two user devices, e.g., UEs, for example under a PC5-RRC connection.

For example, according to some embodiments, the transmission of a SL LCH between two SL UEs may take place via multiple SL carriers or two resource pools and, thus, the proposed solution for multi-cell scenario according to some embodiments can be applied by considering the SL transmissions via multiple SL carriers or multiple SL resource pools.

In other embodiments, the approach of some embodiments depicted for a single cell scenario may be applied for transmitting a SL LCH between the two SL UEs via a single SL carrier or a single SL resource pool. Applying the proposed scheme in SL communication according to some embodiments can have similar advantages as described referring to some embodiments for a communication between a UE and network, e.g. to avoid PC5-RLC declaration and allow that service can continue for other SL RLC entities/LCHs despite an SL RLC failure is affecting one SL RLC entity/LCH.

According to some embodiments, it is noted that, in case of sidelink communication, a (re)-configuration of a UE's SL RB/RLC entity/LCH may be performed either by the SL UE itself or by the network, depending on the SL transmission mode and/or the UE RRC state.

BRIEF DESCRIPTION OF THE FIGURES

Some exemplary embodiments will now be described with reference to the accompanying drawings in which.

DESCRIPTION OF SOME EMBODIMENTS

Figures 1, 2:
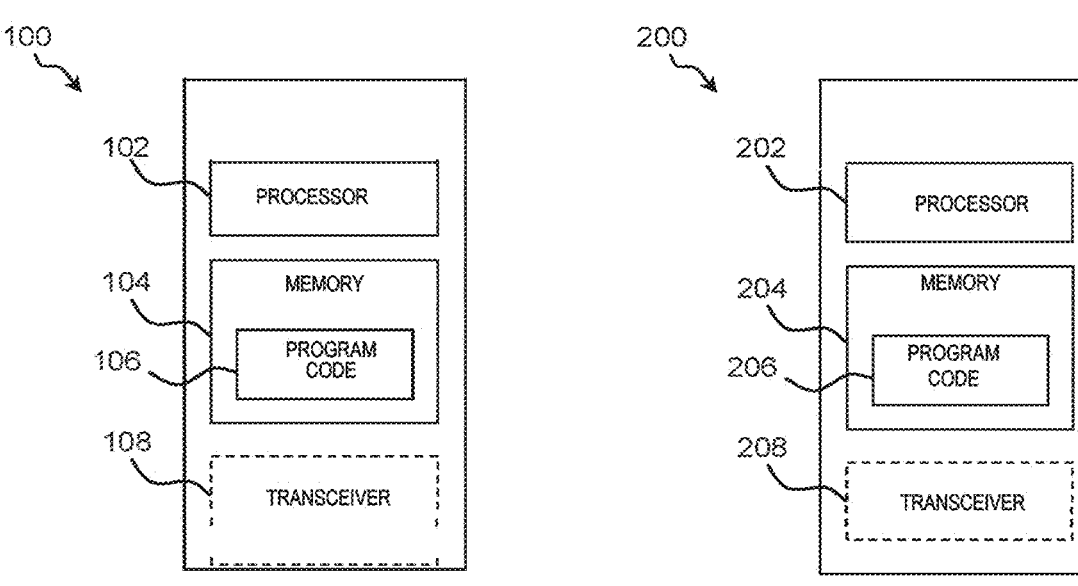
FIG. 1 schematically depicts a simplified block diagram of an apparatus according to some embodiments, FIG. 2 schematically depicts a simplified block diagram of a user equipment according to some embodiments, FIG. 3 schematically depicts a simplified block diagram of a communications system according to some embodiments, FIG. 4 schematically depicts a simplified flow chart of a method according to some embodiments, FIG. 5 schematically depicts a simplified block diagram of an RLC failure configuration according to some embodiments, and FIG. 6, 7, 8, 9, 10 each schematically depict a simplified flow chart of a method according to some embodiments.

Some embodiments relate to an apparatus for a wireless communications system. FIG. 1 schematically depicts a simplified block diagram of the apparatus 100 according to some embodiments, and FIG. 4 schematically depicts a simplified flow chart of a method of operating the apparatus according to some embodiments. The apparatus 100 (FIG. 1) comprises at least one processor 102, and memory 104 storing instructions 106 that, when executed by the at least one processor 102, cause the apparatus 100 at least to configure 300 (cf. FIG. 4) a user equipment with a radio link control, RLC, failure configuration RLC-FCFG which defines how the user equipment should react to an RLC failure of a first logical channel associated with the user equipment.

According to some embodiments, some of the RLC failure configuration at the user equipment may also be specified in a standard, e.g. in a 3GPP technical specification or the like, and/or may be provisioned by UE-implementation.

In some embodiments, after configuring 300 the user equipment with the RLC failure configuration RLC-FCFG, the apparatus 100 may receive, cf. step 302 of FIG. 4, an RLC failure from the user equipment, e.g. in the form of at least one RLC failure report RLC-FR.

In some embodiments, the apparatus 100 (FIG. 1) may comprise a transceiver 108 for exchanging, i.e. transmitting and/or receiving, radio frequency, RF, signals with other components such as e.g. user equipment, UE, 200, cf. e.g. FIG. 2, and/or further devices (not shown).

Figure 3:
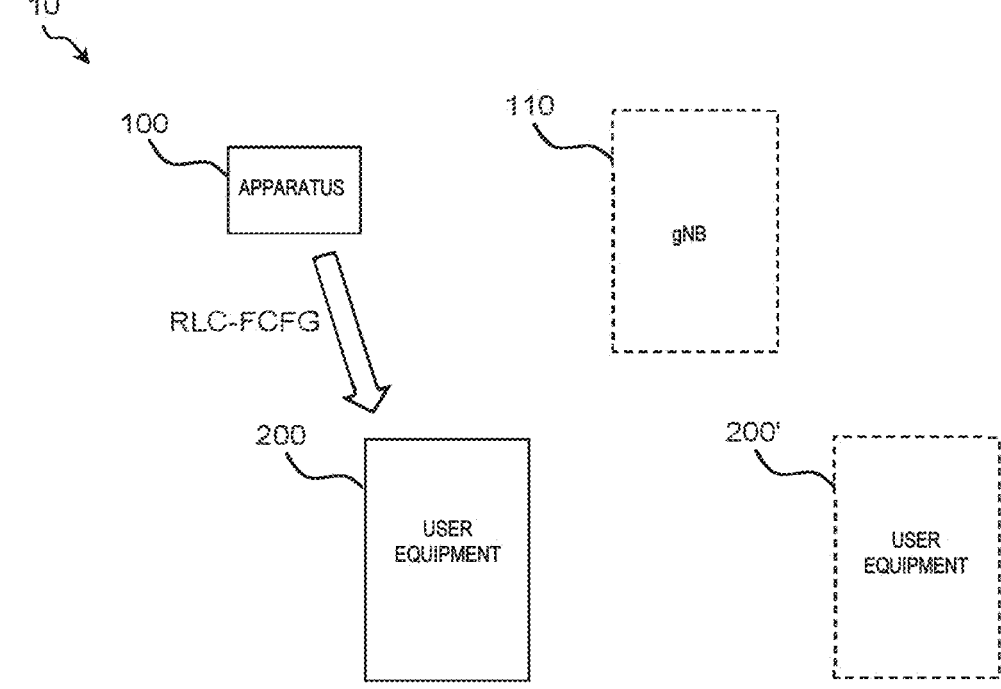

FIG. 3 schematically depicts a simplified block diagram of a communications system 10 according to some embodiments.

The communications system 10 may e.g. comprise the apparatus 100. The communications system 10 may further comprise at least one user equipment, UE, 200. Reference sign 200' denotes optional further UE.

In some embodiments, the apparatus 100 or its functionality, respectively, may be provided in a network element of the communications systems 10, for example in a base station 110, e.g. a gNodeB (gNB) 110.

In some embodiments, the apparatus 100 according to the embodiments or its functionality, respectively, may be used for or within wireless communications systems 10 based on or at least partially adhering to third generation partnership project, 3GPP, radio standards such as 4G E-UTRAN or 5G NR (fifth generation new radio). In some embodiments, the apparatus 100 according to the embodiments or its functionality, respectively, may be used for a radio link failure (RLF), procedure of 5G NR-based communications systems 10.

In some embodiments, the UE 200, also cf. FIG. 2, may comprise at least one processor 202, and memory 204 storing instructions, e.g. in the form of computer program code 206.

Optionally, according to further exemplary embodiments, the UE 200 may comprise a transceiver 208 for exchanging, i.e. transmitting and/or receiving, radio frequency, RF, signals with other components such as e.g. the apparatus 100 or the gNB 110 (FIG. 3), and/or further devices (not shown).

As an example, one triggering condition for an RLF in a Uu interface as currently defined e.g. for 5G NR is characterized as follows: upon indication from a radio link control (RLC) layer that a maximum number of RLC retransmissions has been reached when using an RLC acknowledged mode (AM). According to this triggering condition, a maximal number of retransmissions in RLC is configured by using a parameter "maxRetxThreshold", which is configured in the information element (IE) "RLC-Config", as per 3GPP TS 38.331 (cf. e.g. 3GPP TS 38.331 V15.8.0 (2019-12)), and used by a transmitting side of an AM RLC entity to limit a total number of retransmissions of an RLC packet data unit (PDU).

The maximal number of retransmissions parameter (i.e. maxRetxThreshold configured in RLC-Config) as currently defined e.g. for 5G NR applies to RLC AM as defined in 3GPP TS 38.331, where value t1 corresponds to 1 retransmission, value t2 corresponds to 2 retransmissions and so on. If the maximal number of retransmissions of an RLC entity is reached in an exemplary single cell scenario, a RLF will be declared, which will trigger the UE to re-establish the RRC connection with NW—as described above. More specifically, all radio bearers (RBs) except SRB0 will be suspended at the time when the RLF is declared. These suspended RBs (i.e., SRB2 and DRBs) can be resumed first upon receiving the first RRCReconfiguration message after the RRC connection re-establishment procedure is successfully completed. Thus, the user-plane data cannot be transmitted during the time when the DRBs are being resumed, thus causing an undesired interruption in the running applications.

As per TS 38.331, RLC-Config is comprised within the IE RLC-BearerConfig, which is used to configure an RLC entity and the corresponding logical channel (LCH) in MAC for uplink (besides the linking to a PDCP entity). Thus, distinct RLC entities can be configured for the UE 200 (e.g. for different logical channels) and these can be configured differently, e.g. with different values for the maximal number of retransmissions.

In the current definition of RLF, as currently defined e.g. for 5G NR, a RLC failure for one logical channel/RLC entity (e.g., when reaching the maxRetxThreshold) implies the declaration of an RLF, and in turn, the suspending of all DRBs, which will interrupt the data transmission on any other DRB.

As an example, first, when an RLC failure happens, it could be due to a radio condition and/or protocol problems. In case of radio problems, it means that even RLC retransmissions cannot help recovering from radio losses. Although it can be expected that typically a radio link monitoring (RLM) procedure can detect a radio issue before an RLC failure happens, the RLM procedure as currently defined e.g. for 5G NR is limited to a primary cell (PCell). Thus, RLC failures may occur likely due radio problems on secondary cells (SCells) or due to a protocol failure (including a configuration issue), rather than a radio issue only on the PCell.

Besides, 5G NR also introduced a restriction of "allowed cells" an LCH can use which is different to legacy LTE in that an RLC failure for a LCH might only be a problem for those allowed cells for that LCH (e.g. if they are unlicensed cells, high frequency cells etc.) but should not impact other LCHs if they are using different cells with higher reliability/ better channel quality.

This means that, according to some embodiments, an RLC failure of one RLC entity may not imply that another other logical channel cannot be supported adequately. This is an aspect which may be especially relevant when different service types with divergent quality of service (Qos) requirements coexist in a device. For example, achieving the maxRetxThreshold value from a logical channel used for a ultra-reliable and low-latency communication (URLLC) service should not necessarily trigger a suspension of logical channels with more relaxed QoS requirements, e.g. logical channels used to support massive machine type communication (mMTC) and/or enhanced mobile broadband (eMBB) services.

As a further example, secondly, the re-establishment that is triggered because of an RLC failure may be a comparatively slow procedure since it may include a cell selection (of the old or a new cell), a random-access procedure to the selected cell, with several RRC messages to be exchanged. In case of an RLC failure that is caused by protocol/ configuration issues, a recovery attempt by the same cell (e.g. by reconfiguring the affected RLC entity) may be likely successful. But that would be initiated only after an unnecessary delay due to the re-establishment.

In view of this, some embodiments address aspects such as e.g. a method for handling RLC failures which aims at a faster recovery of an affected RLC entity (i.e. the RLC entity that detected the RLC failure(s)), while at the same time they may allow non-affected RLC entities to continue their service.

According to some embodiments, as already mentioned above, the user equipment 200 (FIG. 3) may use the RLC failure configuration RLC_FCFG (FIG. 4) provided e.g. by configuration via the apparatus 100 according to some embodiments to determine how to react to such RLC failure.

According to some embodiments, the RLC failure configuration RLC_FCFG defines whether the user equipment 200 should notify the RLC failure of the first logical channel to the network, e.g. to apparatus 100 or the gNB 110.

According to some embodiments, the RLC failure configuration defines whether the user equipment 200 should notify the RLC failure of the first logical channel to the network, when at least a second logical channel associated with the user equipment 200 operates normally, i.e. does not experience an RLC failure. According to some embodiments, this may enable to keep a normal, i.e. uninterrupted, operation for at least the second LCH and/or RB associated therewith, e.g. rather than declaring a RLF and initiating a re-establishment.

As an example, a second logical channel associated with the user equipment operates normally, e.g. when the second logical channel has not reached a predetermined number (e.g. the first threshold or the maximum RLC retransmission number) of RLC retransmissions.

According to some embodiments, the UE 200 may be configured with multiple LCHs and/or RLC entities.

According to some embodiments, the UE 200 may be configured with an individual RLC failure configuration RLC_FCFG per UE or per LCH. In case of per LCH RLC failure configuration RLC_FCFG, it enables to provide different LCHs with different RLC failure configurations.

According to some embodiments, the instructions 106 (FIG. 1), when executed by the at least one processor 102, further cause the apparatus 100 to explicitly configure the user equipment 200 with the RLC failure configuration RLC_FCFG. According to some embodiments, the RLC failure configuration RLC_FCFG may be explicitly provided to the UE 200, e.g. together with further information transmitted from the apparatus 100 to the UE 200, such as e.g. a configuration for RLC entities of the UE 200.

According to some embodiments, the user equipment 200 may also be configured implicitly with the RLC failure configuration RLC-FCFG.

According to some embodiments, which may e.g. be based on a multi-cell carrier aggregation (CA)/dual connectivity (DC) scenario, per-LCH configuring whether an RLC failure for an LCH should trigger an RLC failure report rather than re-establishment may be done implicitly, e.g. based on an allowed cell configuration for the LCH.

According to some embodiments, the implicit configuration may be part of the allowed cell configuration and may be enabled/disabled per UE 200, 200' (FIG. 3). For instance, the configured cells that are allowed for a failed LCH, i.e. the first LCH, can be considered failed and may thus be suspended/deactivated, as long as there is at least another cell not failed and mapped to at least another LCH: under these conditions, according to some embodiments, an RLC failure report may be triggered without (RRC) re-establishment. According to some embodiments, otherwise, e.g. if any other cell is also failed or no other non-failed LCH is mapped to a cell, an RRC re-establishment is initiated.

In some embodiments, the allowed cells are unlicensed cells and/or high frequency cells (e.g., using the frequency range FR2 as e.g. defined by 3GPP 38.101-1, cf. e.g. 3GPP TS 38.101-1 V16.2.0 (2019-12), Table 5.1-1), since these may be more prone to radio errors. This ensures that problems on these cells will not impact other LCHs if they are using different cells with higher reliability/better channel quality.

In some embodiments, cf. FIG. 5, the RLC failure configuration RLC_FCFG comprises a first threshold T1, wherein the user equipment 200 may determine, based on the first threshold, whether to transmit the RLC failure to the network, e.g. to the gNB 110.

In some embodiments, the first threshold T1 may be a predetermined number of RLC retransmissions.

According to some embodiments, which may e.g. be based on a single-cell scenario or a multi-cell CA/DC scenario, the first threshold T1 may be seen as a new (additional) threshold in view of the existing threshold parameter "maxRetxThreshold", which is configured in the information element (IE) "RLC-Config", as per 3GPP TS 38.331 (cf. e.g. 3GPP TS 38.331 V15.8.0 (2019-12)).

According to some embodiments, the first (i.e., new) threshold T1 may e.g. be denoted as "maxRetxThreshold_RLCReport" and may be configured to the UE 200 to determine a) when (and/or whether) to report the RLC failure of the first LCH, for example if the current number of RLC AM retransmissions reaches the first threshold, and/or b) when (whether) to declare an RLF (e.g., if the current number of RLC AM retransmissions reaches the existing threshold parameter "maxRetxThreshold" defined for RLF detection).

According to some embodiments, the value of the first threshold T1 "maxRetxThreshold_RLCReport" can be set lower than the existing "maxRetxThreshold", e.g. to first trigger a report. According to some embodiments, this enables an attempt to first recover/solve an RLC failure issue, e.g. by reconfiguring of protocol parameters for the affected (first) LCH or changing the allowed cells and/or other LCP restrictions, before declaring an RLF and suspending all DRBs.

According to some embodiments, the RLC failure configuration RLC-FCFG (FIG. 5) comprises a first control information CI1 indicating to the user equipment 200 whether to disable at least one mapping restriction.

According to some embodiments, which may e.g. be based on a single-cell scenario or a multi-cell CA/DC scenario, upon detecting that a given number of RLC AM retransmissions is reached for an RLC entity/LCH (corresponding e.g. to the maximum number defined for RLF detection (e.g., existing "maxRetxThreshold") or to a lower configured number, e.g. the first threshold according to some embodiments explained above), if the LCH is configured with LCP (logical channel prioritization) mapping restrictions (e.g. according to allowedCG_list, allowedPriorityLevels, and allowedServingCells, cf. e.g. 3GPP TS 38.300 V15.8.0 (2019-12), e.g. chapter 16.1.2), the UE 200 (FIG. 3) may disable at least one of those mapping restrictions (e.g., instead of triggering a RLF), which may be beneficial to get data to be transmitted through as soon as possible, and which may exemplarily be referred to as some actions of the "recovery behavior" according to some embodiments.

According to some embodiments, the disabling of least one of those mapping restrictions may be performed automatically, i.e. without an explicit instruction to be received by the UE 200.

According to some embodiments, enabling this "recovery behavior" may depend on a network configuration. The configuration (e.g., in addition to the possible first threshold T1 according to some embodiments explained above) may indicate which LCP mapping restrictions to disable (e.g., via an information element (IE) "RestrictionsDisableList"). For instance, according to some embodiments, after disabling a restriction according to "allowedServingCells", the UE 200 may fill an UL grant applicable to a cell previously restricted for the affected (e.g., first) LCH with data from that LCH. According to some embodiments, in turn, the presence of data of that LCH in the transmission corresponding to that grant may be implicitly indicative for the network that the UE 200 has disabled the (LCP mapping) restriction, and in turn that the UE 200 has experienced an RLC failure or the UE has reached the first threshold according to some embodiments explained above.

According to some embodiments, the first control information CI1 indicates which of a plurality of mapping restrictions to disable.

According to some embodiments, the RLC failure configuration RLC-FCFG (FIG. 5) comprises at least one priority threshold P1, P2, wherein the user equipment 200 may determine, based on the at least one priority threshold P1, P2 whether to transmit the RLC failure to the network.

According to some embodiments, the user equipment 200 may determine, based on the at least one priority threshold P1, P2 and on at least one of: a) a lowest priority of logical channels associated with the user equipment 200, b) a priority of the first logical channel, whether to transmit the RLC failure to the network.

According to some embodiments, a first priority threshold P1 and a second priority threshold P2 may be provided, e.g. by network or by pre-configuration.

According to some embodiments, which may e.g. be based on a single-cell scenario or a multi-cell CA/DC scenario, the UE 200 may send an RLC failure report RLC-FR (FIG. 4) to the NW or apparatus 100 if the lowest priority of all existing logical channels is lower than the first configured threshold P1, and the priority of the LCH detecting RLC failure is higher than the second threshold P2. According to some embodiments, if another LCH with certain (i.e., non-vanishing) QoS difference and/or configuration difference comparing to the LCH detecting the RLC failure is configured, the RLC failure from the affected LCH (i.e. the one detecting the RLC failure) need not imply the failure of the other LCH and, thus, the other LCH should not be affected. Alternatively, according to some embodiments, it is configured per LCH or a priority threshold if a failure happens to an LCH with higher or lower priority than a configured threshold, RLC failure report RLC-FR is triggered.

According to some embodiments, the instructions 106 (FIG. 1), when executed by the at least one processor 102, further cause the apparatus 100 to configure 300 the user equipment 200, for example an LCH/RLC entity, with a second control information CI2 (FIG. 5), for example a flag, indicating at least one of: a) the user equipment 200 should declare a radio link failure upon detection of the RLC failure of the first logical channel, b) the user equipment 200 should transmit the RLC failure of the first logical channel to the network, e.g. in the form of an RLC failure report RLC-FR, c) the user equipment 200 should declare a radio link failure (RLF) upon detection of an RLC failure of at least one other logical channel than the first logical channel, d) the user equipment 200 should transmit the RLC failure report upon detection of an RLC failure of at least one other logical channel than the first logical channel.

According to some embodiments, the second control information CI2, for example the flag, can be set considering the QoS requirements of the LCH/RLC entity and/or the set of configured LCH/RLC entities.

According to some embodiments, the instructions 106, when executed by the at least one processor 102, further cause the apparatus 100 to set at least a part of the RLC failure configuration RLC-FCFG based on at least one user equipment specific condition.

According to some embodiments, the value of the first threshold T1 and/or the conditions to declare a radio link failure and/or to send an RLF failure report can be set considering UE-specific conditions, e.g. the existing services in the UE 200 and optionally also their Qos requirements. For instance, if both an eMBB service and a URLLC service coexist according to some embodiments, an RLC failure only from the URLLC service may not declare an RLF.

According to some embodiments, a or the first threshold and a second threshold may be configured, and the UE 200 may send an RLC failure report to the NW if the highest value of the maximal number of retransmissions parameter (i.e. "maxRetxThreshold" configured in RLC-Config) as currently defined e.g. by 5G NR for an existing logical channel is higher than the first configured threshold, and the value of the "maxRetxThreshold" of the LCH detecting RLC failure is lower than the second configured threshold. In this option, the UE 200 can ensure a large difference in terms of maxRetxThreshold between the declaring LCH (LCH that declares a RLF) and other LCHs. Thus, the RLC failure of the affected RLC entity should not affect the operation of another LCH.

According to some embodiments, the instructions 106, when executed by the at least one processor 102, further cause the apparatus 100 to broadcast at least a part of the RLC failure configuration RLC-FCFG (FIG. 3), for example at least one of: the first threshold, the second threshold.

According to some embodiments, the apparatus 100 or the network may broadcast at least a part of the RLC failure configuration, for example at least one of the first threshold, the second threshold, in a system information block (SIB).

Further embodiments relate to the UE 200 (FIG. 2) comprising the processor 202, and memory 204 storing instructions 206 that, when executed by the at least one processor 202, cause the user equipment 200 at least to, also cf. the flow chart of FIG. 6, determine 350 the radio link control, RLC, failure configuration RLC-FCFG, which defines how the user equipment 200 should react to an RLC failure of a first logical channel associated with the user equipment 200.

According to some embodiments, determining 350 the RLC failure configuration RLF-FCFG may comprise at least one of: receiving (e.g., for embodiments with explicit configuration) the RLC failure configuration RLC-FCFG from an apparatus, e.g. an apparatus 100 according to the embodiments, and/or a gNB 110, determining the RLC failure configuration RLC-FCFG from other data and/or configuration (e.g., for embodiments with implicit configuration).

According to some embodiments, at least some of the RLC failure configuration at the user equipment may also be specified in a standard, e.g. in a 3GPP technical specification, and/or may be provisioned by UE-implementation.

According to some embodiments, the instructions 206, when executed by the at least one processor 202, further cause the user equipment 200 to determine 352, based on the RLC failure configuration RLC-FCFG, whether the user equipment 200 should notify the RLC failure of the first logical channel to the network, e.g. when at least a second logical channel associated with the user equipment 200 operates normally.

According to some embodiments, the instructions 206, when executed by the at least one processor 202, further cause the user equipment 200 to determine 360 (FIG. 7) the RLC failure configuration RLC-FCFG based on a configuration of allowed cells for at least one logical channel.

According to some embodiments, the RLC failure configuration comprise the first threshold T1, wherein the instructions 206, when executed by the at least one processor 202, further cause the user equipment 200 to determine 362 (FIG. 7), based on the first threshold T1, whether to transmit the RLC failure to the network.

According to some embodiments, the RLC failure configuration comprises the first control information CI1 indicating to the user equipment 200 whether to disable at least one mapping restriction, wherein the instructions 206, when executed by the at least one processor 202, further cause the user equipment 200 to disable 364 (FIG. 7) the at least one mapping restriction based on the first control information.

According to some embodiments, the RLC failure configuration RLC-FCFG comprises the at least one priority threshold P1, P2, wherein the instructions 206, when executed by the at least one processor 202, further cause the user equipment 200 to determine, based on the at least one priority threshold, and optionally, on at least one of: a) a lowest priority of logical channels associated with the user equipment, b) a priority of the first logical channel, whether to transmit the RLC failure to the network.

According to some embodiments, the instructions 206, when executed by the at least one processor 202, further cause the user equipment 200 to: determine whether a predetermined number of RLC retransmissions is reached for a logical channel served by a first cell, and, if the predetermined number of RLC retransmissions is reached for the logical channel, to transmit the RLC failure to the network for the logical channel if at least one further logical channel served by the first cell has not reached a predetermined number of RLC retransmissions.

According to some embodiments, the instructions 206, when executed by the at least one processor 202, further cause the user equipment 200 to: determine if it can re-select another cell, which has a radio channel quality better than a first quality threshold, and, if it can re-select another cell, which has a radio channel quality better than the first quality threshold, to re-establish a radio resource control, RRC, connection with the other cell based on the RLC failure configuration, and, if it cannot re-select another cell, which has a radio channel quality better than the first quality threshold, to determine whether to send an RLC failure report to a current serving cell based on the RLC failure configuration.

According to some embodiments, the UE's upper layers may be configured, e.g. by the apparatus 100 and/or the network or gNB 110, to act differently upon receiving a report of RLC failure from an RLC entity: According to some embodiments, the upper layers may analyze the affected services due to the RLC failure (i.e., the service(s) with data to be transmitted in the logical channel detecting the RLC failure).

According to some embodiments, the upper layers of the UE 200 may check if certain service/application(s) cannot be supported any more, e.g. due to the RLC failure of the first LCH. According to some embodiments, if a service has strict QoS requirements, it probably needs to be stopped due to the unavailability of the LCH detecting the RLC failure. In this case, according to some embodiments, if this service uses multiple LCHs and some of these LCHs are only used by this service, the RLC failure message may also contain an information/recommendation to suspend the LCHs/RBs, which are only used by the affected service. This may ensure the LCHs only serving the affected service will be suspended. According to some embodiments, after its suspension, the LCH will not be used in the following transmission until it is resumed and/or reconfigured.

According to some embodiments, if the affected service can adjust itself to tolerate the deteriorated performance, the UE 200 may indicate this in the RLC failure report RLC-FR (FIG. 3), e.g. by including a corresponding indication in the RLC failure report RLC-FR. According to some embodiments, this indication may provide the NW with the flexibility to decide whether to reconfigure the affected LCH/DRB or to suspend it. According to some embodiments, again, an indication of the LCH(s) only serving the affected service can be included in the RLC failure report so that the NW can make a decision with better knowledge.

FIG. 8 schematically depicts a simplified flow chart of a method according to some embodiments. In step 400, the UE 200 (FIG. 3) may be configured with multiple LCHs/RLC entities, and with an RLC failure configuration RLC-FCFG, for example an RLC failure configuration RLC-FCFG per LCH. In step 401, the UE 200 determines whether a RLC failure is detected for an LCH (i.e., one of the multiple LCHs configured in step 400). If not, the method returns to step 401. If an RLC failure is detected for an LCH, i.e. the first LCH, the method proceeds with step 402, in which the RLC entity affected by the RLC failure sends an indication to the UE's RRC layer. In step 403 it is determined by the UE 200, based on the RLC failure configuration RLC-FCFG, whether to trigger an RLC failure report. If, in step 403, it is determined to trigger the RLC failure report, the method proceeds with step 404, in which the UE 200 may send the RLC failure report RLC-FR (FIG. 4) to the network (e.g., the apparatus 100 and/or the gNB 110) and/or, according to some embodiments, if configured, disable at least one of the mapping restrictions, e.g. disable the allowed cells restrictions for the affected LCH.

If, in step 403, it is determined not to trigger the RLC failure report, the method proceeds with step 405, in which it is determined whether an RLF declaration is triggered. If so, the method proceeds with step 406, in which the UE 200 initiates an RRC re-establishment procedure. If not, the method proceeds with step 401. In some embodiments, advantageously, an RRC re-establishment procedure, cf. step 406 of FIG. 8, may be avoided. Instead, step 404 may be performed.

FIG. 9 schematically depicts a simplified flow chart of a method according to some embodiments. Note that user-plane transmissions are not shown for the sake of simplicity. Reference sign 410 symbolizes a configuration RLC-Config for one or more RLC entities of the UE 200. According to some embodiments, the configuration 410 may also comprise the RLC failure configuration RLC-FCFG (also cf. FIG. 3) according to some embodiments, e.g. comprising the first threshold T1 (also cf. FIG. 5) and/or the "RestrictionsDisableList" IE explained above, e.g. for UL-AM-RLC. Reference sign 411 symbolizes an LCP restriction configuration e.g. characterizing LCP mapping restrictions according to allowedCG_list, allowedPriorityLevels, and allowedServingCells, cf. e.g. 3GPP TS 38.300 V15.8.0 (2019-12), e.g. chapter 16.1.2. Block 412 indicates a step of radio link monitoring (RLM) performed by the UE 200, and block 413 indicates a detection of a configured trigger for an RLC failure report, and, according to some embodiments, disabling the LCP restriction(s) as configured earlier, cf. reference sign 411. Arrow 414 indicates a transmission of RLC failure information to the gNB 110, and block 415 characterizes a network action as performed upon receipt of, e.g. based on, the RLC failure information. According to some embodiments, the network action 415 may comprise a reconfiguration. Accordingly, arrow 416 may represent a reconfiguration message to the UE 200, such as an RRCReconfiguration, which may e.g. include a (new) RLC configuration. Block 417 indicates the UE reconfiguring the LCH affected by the RLC failure, and may, according to some embodiments, also comprise enabling the previously disabled (cf. block 413) LCP restrictions. Alternatively, the UE may enable the LCP restrictions in Block 417 based on the reconfiguration message received in 416.

Figure 10:
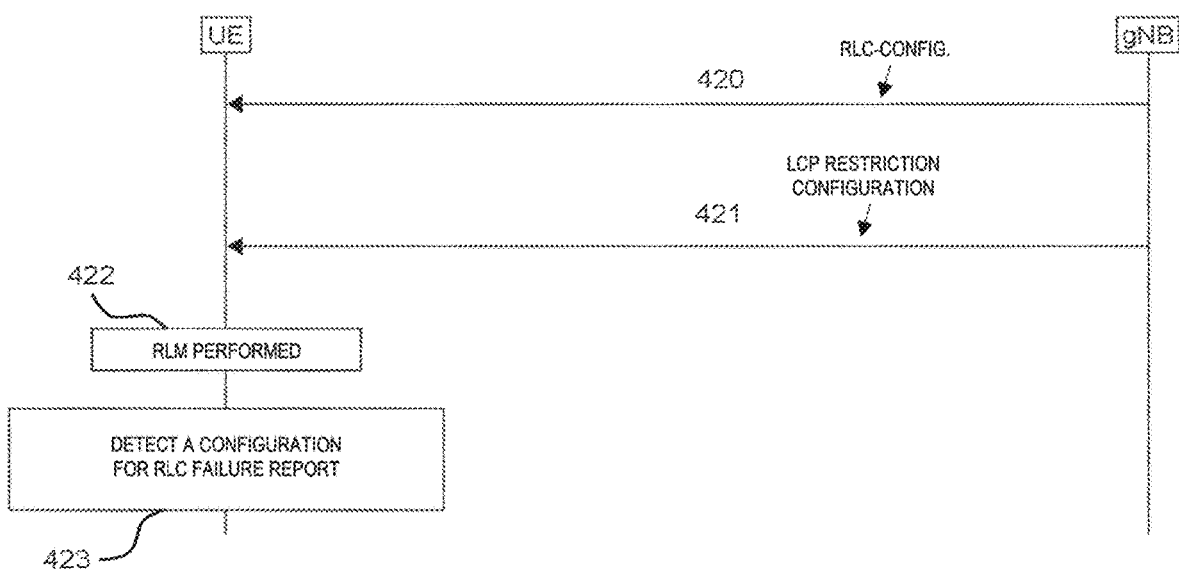

FIG. 10 schematically depicts a simplified flow chart of a method according to some embodiments. Note that, similar to FIG. 9, user-plane transmissions are not shown for the sake of simplicity. Similar to arrow 410 of FIG. 9, reference sign 420 of FIG. 10 symbolizes a configuration RLC-Config for one or more RLC entities of the UE 200. According to some embodiments, the configuration 420 may also comprise the RLC failure configuration RLC-FCFG (also cf. FIG. 3) according to some embodiments, e.g. comprising the first threshold T1 (also cf. FIG. 5) and/or the "RestrictionsDisableList" IE explained above, e.g. for UL-AM-RLC. Reference sign 421 symbolizes an LCP restriction configuration e.g. characterizing LCP mapping restrictions according to allowedCG_list, allowedPriorityLevels, and allowedServingCells, as mentioned above. Similar to blocks 412, 413 of FIG. 9, blocks 422, 423 of FIG. 10 indicate a step of radio link monitoring (RLM) performed by the UE 200 (block 422) and a detection of a configured trigger for an RLC failure report, and, according to some embodiments, disabling the LCP restriction(s) as configured earlier, cf. reference sign 421 (block 423).

According to some embodiments, the RLC failure information may also be implicitly indicated to the network, once the network detects from uplink reception that the UE 200 has disabled the LCP restriction(s).

According to some embodiments, one or more of the following network actions, e.g. legacy network actions, may be performed, which may be triggered by receiving the RLC failure indication (cf. e.g. arrow 414 of FIG. 9). According to some embodiments, the network actions may take place to attempt recovering the service for the LCH/RB affected by the RLC failure:

The NW may decide to suspend the affected DRB(s) while continuing other services for the UE 200.

The NW may decide to suspend the affected LCH entity but continuing the service of affected RBs/LCHs by mapping the traffic of the affected DRBs/LCHs to a non-affected LCH entity.

The NW may re-configure the affected DRBs/LCHs so that the affected service(s) can still continuously be served.

The NW may proactively reconfigure the other DRBs/LCHs that have similar or stricter QoS requirements than the DRB/LCH declaring the RLC failure. According to some embodiments, the proactive reconfiguration, e.g. by increasing the parameter "maxRetxThreshold", can help to achieve a better service continuity for the considered DRBs/LCHs by potentially avoiding RLC failures affecting other RBs in the future.

The NW may, e.g. alternatively, decide to trigger a change of the serving cell or serving bandwidth. For example, if the NW has received multiple RLC failure reports from the same or different RLC entity(s), the NW may decide to trigger deactivation of the serving cell, reconfiguring serving beams, a BWP (bandwidth part) switching or handover etc.

According to some embodiments, the RB/LCH affected by the RLC failure is not configured with duplication ("non-duplication scenario").

According to some embodiments, the failure of an LCH/RB operating on a cell may not lead to suspending the entire cell operations but only the affected LCH.

According to some embodiments, one or more services can continue for other RBs despite an RLC failure is affecting one RB, and in the meanwhile, the network may cure the problem related to the RLC failure of the affected RB, e.g. as fast as possible, in turn shortening the recovery time. According to some embodiments, during the recovery is attempted, the affected RLC/LCH (failed) can be served using any cell that is not suspended even if originally that cell was not allowed (i.e. disabling LCP mapping restrictions upon RLC failure according to some embodiments).

In other words, some embodiments do not introduce additional delay in solving an RLC failure affecting the RB as compared to the conventional approaches (e.g., triggering of an RLF and RRC re-establishment), as the RLC failure report should be received by the network at the same time or earlier than the RLF report in most scenarios.

Though some of the elaborations and embodiments use the radio interface between a UE and a network, e.g. gNB, according to some embodiments, the basic principle may also be applied for other communications and/or radio interfaces as well, e.g. to handle an RLC failure of a sidelink (SL) RLC entity that may be used for a sidelink communication between two user devices, e.g., UEs, for example under a PC5-RRC connection.

For example, according to some embodiments, the transmission of a SL LCH between two SL UEs may take place via multiple SL carriers or two resource pools and, thus, the proposed solution for multi-cell scenario according to some embodiments can be applied by considering the SL transmissions via multiple SL carriers or multiple SL resource pools.

In other embodiments, the approach of some embodiments depicted for a single cell scenario may be applied for transmitting a SL LCH between the two SL UEs via a single SL carrier or a single SL resource pool. Applying the proposed scheme in SL communication according to some embodiments can have similar advantages as described referring to some embodiments for a communication between a UE and network, e.g. to avoid PC5-RLC declaration and allow that service can continue for other SL RLC entities/LCHs despite an SL RLC failure is affecting one SL RLC entity/LCH.

According to some embodiments, it is noted that, in case of sidelink communication, a (re)-configuration of a UE's SL RB/RLC entity/LCH may be performed either by the SL UE itself or by the network, depending on the SL transmission mode and/or the UE RRC state.

Even though some embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiments. It will be obvious to a person skilled in the art that, as technology advances, the concept according to the embodiments can be implemented in various ways. Further, it is clear to a person skilled in the art that the described embodiments may, but are not required to, be combined with other embodiments in various ways.

What is claimed is:

1. A user equipment comprising at least one processor, and memory storing instructions that, when executed by the at least one processor, cause the user equipment at least to:

determine a radio link control, RLC, failure configuration which defines how the user equipment should react to an RLC failure of a first logical channel associated with the user equipment, wherein the RLC failure configuration comprises at least one priority threshold;

determine, based on the at least one priority threshold and on at least: (a) a lowest priority of logical channels associated with the user equipment, and (b) a priority of the first logical channel, whether to transmit the RLC failure to the network, wherein the user equipment is configured with a second control information indicating: (a) the user equipment should declare a radio link failure upon detection of the RLC failure of the first logical channel, (b) the user equipment should transmit the RLC failure of the first logical channel to the network, (c) the user equipment should declare a radio link failure upon detection of an RLC failure of at least one other logical channel than the first logical channel, and, (d) the user equipment should transmit the RLC failure of the at least one other logical channel to the network;

determine if the user equipment can re-select another cell, which has a radio channel quality better than a first quality threshold, and, if the user equipment can re-select another cell, which has a radio channel quality better than the first quality threshold, re-establish a radio resource control, RRC, connection with the another cell, and if the user equipment cannot reselect another cell, which has a radio channel quality better than the first quality threshold, determine whether to send an RLC failure report to a current serving cell based on the RLC failure configuration; and send an RLC failure report to the network if the lowest priority of all existing logical channels is lower than a first configured threshold, and the priority of the logical channel detecting RLC failure is higher than a second configured threshold.

2. The user equipment according to claim 1, wherein the instructions, when executed by the at least one processor, further cause the user equipment to determine, based on the RLC failure configuration, whether the user equipment should notify the RLC failure of the first logical channel to a network.

3. The user equipment according to claim 1, wherein the instructions, when executed by the at least one processor, further cause the user equipment to determine, based on the RLC failure configuration, whether the user equipment should notify the RLC failure of the first logical channel to a network, when at least a second logical channel associated with the user equipment operates normally.

4. The user equipment according to claim 1, wherein the instructions, when executed by the at least one processor, further cause the user equipment to determine the radio link control, RLC, failure configuration based on a configuration of allowed cells for at least one logical channel, wherein determining the RLC failure configuration comprises: determining the RLC failure configuration from an apparatus for explicit configuration and determining the RLC failure configuration from other data and configuration information for implicit configuration.

5. The user equipment according to claim 1, wherein the RLC failure configuration comprises a first threshold, wherein the instructions, when executed by the at least one processor, further cause the user equipment to determine, based on the first threshold, whether to transmit the RLC failure to the network.

6. The user equipment according to claim 1, wherein the RLC failure configuration comprises a first control information indicating to the user equipment whether to disable at least one mapping restriction, wherein the instructions, when executed by the at least one processor, further cause the user equipment to disable the at least one mapping restriction based on the first control information.

7. The user equipment according to claim 1, wherein the instructions, when executed by the at least one processor, further cause the user equipment to: determine whether a predetermined number of RLC retransmissions is reached for a logical channel served by a first cell, and, if the predetermined number of RLC retransmissions is reached for the logical channel, to transmit the RLC failure to the network for the logical channel if at least one further logical channel served by the first cell has not reached a predetermined number of RLC retransmissions.

8. The user equipment according to claim 1, wherein the second control information is set considering quality of service requirements of the first logical channel and an RLC entity and a set of configured logical channel and RLC entities.

9. A method of operating a user equipment, the method comprising:

determining a radio link control, RLC, failure configuration which defines how the user equipment should react to an RLC failure of a first logical channel associated with the user equipment, wherein the RLC failure configuration comprises at least one priority threshold;

determining, based on the at least one priority threshold and on at least: (a) a lowest priority of logical channels associated with the user equipment, and (b) a priority of the first logical channel, whether to transmit the RLC failure to the network, wherein the user equipment is configured with a second control information indicating: (a) the user equipment should declare a radio link failure upon detection of the RLC failure of the first logical channel, (b) the user equipment should transmit the RLC failure of the first logical channel to the network, (c) the user equipment should declare a radio link failure upon detection of an RLC failure of at least one other logical channel than the first logical channel, and, (d) the user equipment should transmit the RLC failure of the at least one other logical channel to the network;

determining if the user equipment can re-select another cell, which has a radio channel quality better than a first quality threshold, and, if the user equipment can re-select another cell, which has a radio channel quality better than the first quality threshold, re-establishing a radio resource control, RRC, connection with the another cell, and if the user equipment cannot reselect another cell, which has a radio channel quality better than the first quality threshold, determining whether to send an RLC failure report to a current serving cell based on the RLC failure configuration; and sending an RLC failure report to the network if the lowest priority of all existing logical channels is lower than a first configured threshold, and the priority of the logical channel detecting RLC failure is higher than a second configured threshold.

\* \* \* \* \*